United States Patent [19]
Goltsos

[11] 3,974,353
[45] Aug. 10, 1976

[54] CONVEYORIZED MICROWAVE OVEN

[75] Inventor: Costas E. Goltsos, Weston, Mass.

[73] Assignee: Teckton, Inc., Wellesley, Mass.

[22] Filed: Aug. 26, 1974

[21] Appl. No.: 500,300

Related U.S. Application Data

[63] Continuation-in-part of Ser. No. 361,404, May 18, 1973, abandoned.

[52] U.S. Cl. .................. 219/10.55 A; 219/10.55 E; 219/10.55 F; 426/241
[51] Int. Cl.[2] .......................................... H05B 9/06
[58] Field of Search .......................... 426/241–243; 219/10.55 A, 10.55 E, 10.55 R, 10.55 F, 10.55 M, 388, 399, 405, 411; 126/390

[56] References Cited
UNITED STATES PATENTS

| | | | |
|---|---|---|---|
| 3,079,913 | 3/1963 | Nelson | 219/10.55 E |
| 3,302,632 | 2/1967 | Fichtner | 219/10.55 E |
| 3,422,242 | 1/1969 | Miyata | 219/10.55 A |
| 3,547,661 | 12/1970 | Stevenson | 219/10.55 E |
| 3,665,491 | 5/1972 | Cooper | 219/10.55 A |
| 3,718,082 | 2/1973 | Lipoma | 219/10.55 A |
| 3,854,021 | 12/1974 | Moore et al. | 219/10.55 E |

FOREIGN PATENTS OR APPLICATIONS

| | | | |
|---|---|---|---|
| 2,004,169 | 9/1970 | Netherlands | 219/10.55 A |

*Primary Examiner*—Bruce A. Reynolds
*Attorney, Agent, or Firm*—Wolf, Greenfield & Sacks

[57] ABSTRACT

An oven employing electromagnetic radiation as a source of heat is adapted for use in the mass preparation of complete pre-frozen or refrigerated meals such as in institutional feeding environments and the like. Each meal is prepackaged and contained in a single radiation transparent tray with the various individual foods of the meal being located in selected predetermined compartments of the tray. The oven includes a lower conveyor belt which carries the tray through the oven and an upper conveyor belt which moves through the oven at the same linear speed as the lower conveyor belt but spaced above the lower belt so that the tray may be received and disposed between the belts. Each of the upper and lower belts include means defining radiation transparent apertures arranged in a predetermined array to be alignable with the different compartments in each food tray. The apertures are arranged to control the amount of radiation to which each food in each tray is exposed. The belts and the trays move in unison through the oven at a predetermined rate which is controlled in relation to the degree of energy radiated within the oven so that each of the foods receive, selectively, energy sufficient to properly heat condition them. At the outlet end of the oven, the belts separate and enable the heat conditioned dinner to be removed.

13 Claims, 8 Drawing Figures

CONVEYORIZED MICROWAVE OVEN

CONVEYORIZED MICROWAVE OVEN

This application is a continuation-in-part of application Ser. No. 361,404, filed May 18, 1973, now abandoned.

BACKGROUND OF THE INVENTION

With the recent development of radiant energy cooking ovens, such as those employing microwave or infrared radiation, it has become apparent that they would be useful particularly in mass feeding environments such as in schools, hospitals, or other institutional environments where reduced cooking time is desirable. Accordingly, it is believed that attempts have been made to develop conveyorized automated ovens which were intended to heat or cook large quantities of food for use in such institutional feeding. One of the primary limitations of such ovens has been that because different types of foods require different degrees of microwave or infrared energy in order to be heated or cooked properly, only one type of food could be passed through the automated oven at a time. Thus, in order to prepare a complete meal having a number of different courses, it would be necessary to employ a number of such ovens, each adapted to heat the individual foods appropriately. The use of such multiple ovens is awkward and is not believed to have achieved any significant degree of success. Attempts to convey an entire meal through a single oven have been unsatisfactory. Different foods generally require different amounts of heat and are intended to be served at diifferent temperatures. As a result, when a meal having varied foods was processed simultaneously only one or perhaps two of the foods would be at the optimal temperature. It is among the primary objects of the invention to provide an improved conveyorized microwave or infrared oven which avoids the foregoing difficulties.

In the following description of the invention, the term "heat conditioning" will be used to define generally the application of heat to the extent necessary for the particular food product being heated. In this regard, it may be noted that the invention contemplates that the food components usually will be precooked and frozen for storage until use. Such food preferably are slightly undercooked before freezing so that when heated to the proper serving temperature the added heat may complete the cooking process. In some instances, however, the food may not have been frozen and would require a different degree of heating in order to bring it to the proper condition and serving temperature. The term heat conditioning as employed herein is intended to embrace these or other techniques for heating the food to the proper extent which, in turn, depends on the type of food and its condition before insertion into the radiant energy oven.

SUMMARY OF THE INVENTION

In one aspect of the invention the oven includes a pair of endless conveyor belts which are disposed one above the other. The upper run of the lower conveyor belt is intended to support and carry a food bearing tray through the oven. The lower run of the upper conveyor belt is disposed above the upper run of the lower belt so that the runs may embrace the food tray therebetween The belts move at the same linear speed. The food carrying tray is transparent to microwave energy and is formed to define a number of compartments, each intended to contain a different food component of a complete meal. Each of the belts is provided with means for shielding the food bearing tray from the radiation except for selected radiation transparent regions through which radiant energy may pass to and through the food. The radiation transparent areas are formed in repetitive groups along each of the belts, each group being intended to be operative with one food tray. Each of the groups has radiation transparent windows similar to and preferably substantially identical to each other and, within each group, the location and configuration of the radiation openings are such as to control the amount of radiation to which each of the compartments in the tray is exposed. The groups of openings in the upper belt preferably are substantially identical to and duplicated on the lower belt. The belts and food trays are arranged so that as the food tray is conveyed through the oven, each compartment will be embraced above and below the tray by a substantially identical array of radiation transparent openings. In some instances the invention may be practiced with an arrangement in which the radiation transparent apertures above and below the tray may not be strictly in substantial alignment with each other but preferably at least overlap each other. In other modifications it may sometimes be desirable to provide radiation transparent apertures on one side of the food tray which, while generally registered with the apertures beneath the tray, are of different size. Further, in some instances it is even possible to obtain satisfactory results by shielding the food items from one side only. In which only one belt is required to carry the tray and shielding means together through the oven.

It is among the primary objects of the invention to provide an improved conveyorized radiant energy oven.

A further object of the invention is to provide an improved radiant energy oven which is effective for mass feeding of complete meals.

Another object of the invention is to provide an improved automated radiant energy oven which enables an entire meal of a number of food components to be heat conditioned simultaneously with all the foods in the meal being passed through the same oven at the same time.

Still another object of the invention is to provide an improved radiant energy oven arrangement adapted for use in mass feeding environments in which the requirement of a number of different ovens for different types of foods is eliminated and where there is no limitation on the variety of foods which may be included in the complete meal.

DESCRIPTION OF THE DRAWINGS

The foregoing and other objects and advantages of the invention will be understood more fully from the following detailed description thereof, with reference to the accompanying diagrammatical drawings wherein.

DESCRIPTION OF THE PREFERRED EMBODIMENT

Figure 3:
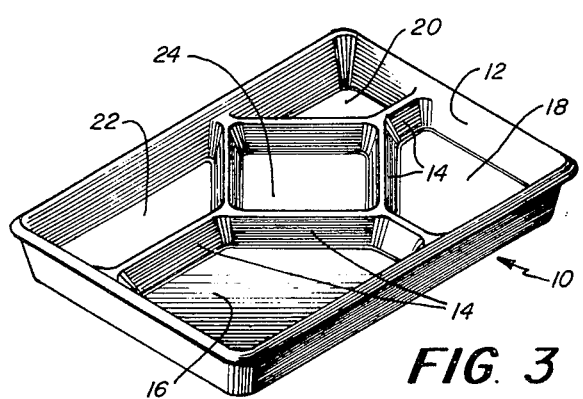
FIG. 3 is an illustration of the radiation transparent food tray.

FIG. 3 shows the food tray, indicated generally by the reference character 10. The food tray is made from an appropriate material which is transparent at least to microwave or infrared radiation, such as styrene, paper or the like. The tray is fabricated to include an upstanding sidewall 12 and a number of interior ridges 14 which cooperate to define a number of compartments 16, 18, 20, 22 and 24. Each of the compartments is intended to contain a different food which, in total, comprise the entire meal. The invention enables wide variety of foods to be included in the tray 10. For example, an entree such as meat may be located in the compartment 16, vegetables in the compartment 18, potatoes in the compartment 20, a cold dessert in the compartment 22 and a roll in the compartment 24. Such varied foods require different amounts of heating and, additionally, are intended to be served at different temperatures. For example, an entree such as meat ordinarily is served approximately 160°F, vegetable and potato at 150°F, a roll at 100°F and a cold dessert at 40°F or even less. As indicated above, prior conveyorized microwave ovens or infrared ovens could not effectively heat condition such a variety of foods simultaneously in the same oven and to the proper extent within the same time period during which the meal was passed through the oven. My invention achieves this objective.

Figure 1:
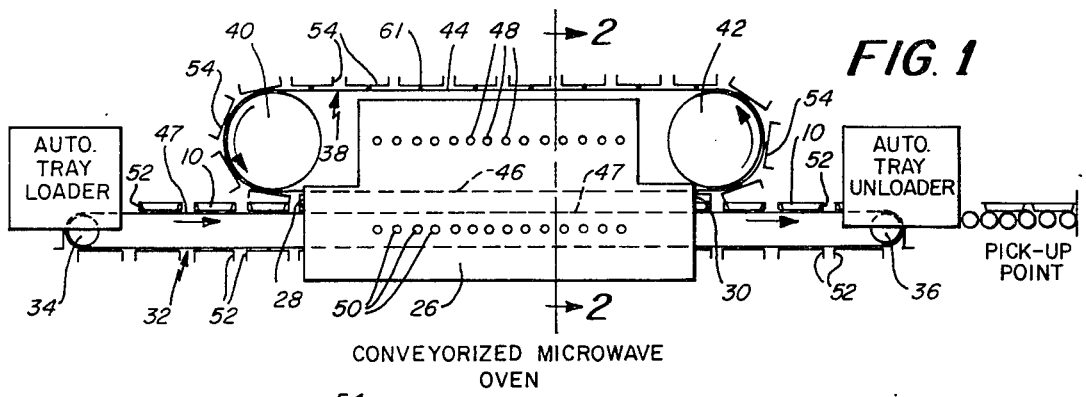
FIG. 1 is a diagrammatic side elevation of the conveyorized oven.
Figure 2:
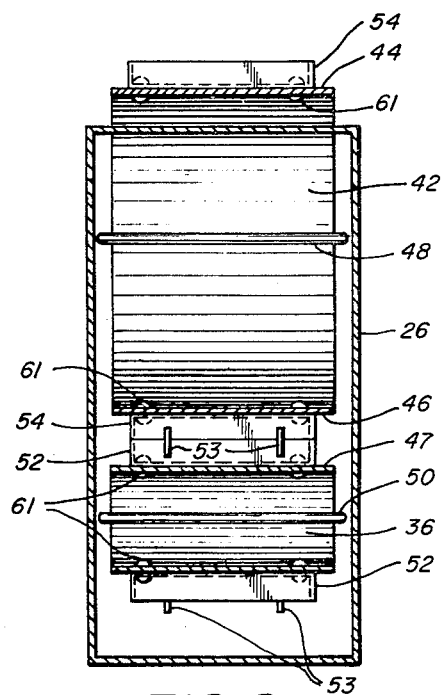
FIG. 2 is a sectional view of the oven as seen from the line 2—2 of FIG. 1.
Figure 2A:
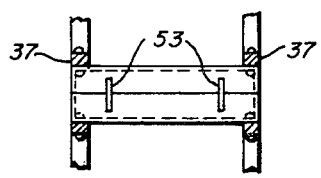
FIG. 2A is an illustration of an alternative form of conveyor belt arrangement.

FIGS. 1 and 2 show, somewhat diagrammatically, the construction of the conveyorized oven in accordance with the invention. The oven itself includes a housing 26 having an inlet end 28 and an outlet end 30. The housing 26, of course, is shielded according to known techniques to preclude microwave energy from being directed out of the oven. The oven includes a lower endless conveyor belt arrangement 32 which passes about a pair of drums 34, 36 at its opposite ends. An appropriate drive means (not shown) may be operatively connected to one of the drums in order to advance the lower conveyor belt 32 endlessly through the oven. In this embodiment, the belt 32 is constructed to be substantially transparent to radiant energy. It may take the form of a fiberglass sheet and suitable radiation transparent binder or may comprise a pair of narrow horizontally spaced belts 37 as suggested in FIG. 2A. The lower conveyor belt arrangement 32 is intended to support and advance food bearing trays 10 through the oven in the manner described more fully below.

The oven includes an upper endless belt arrangement 38 which is of similar construction and which is passed about drums 40, 42 disposed about the inlet and outlet ends 28, 30 of the oven. The upper belt arrangement 38 includes an upper run 44 and a lower run 46 and is arranged so that the lower run passes through the oven, from the inlet 28 to the outlet 30. The lower run 46 of the upper belt 38 is disposed above and spaced from the upper run 47 of the lower conveyor belt arrangement 32 to enable the trays 10 to be disposed therebetween.

The interior of the oven includes suitable radiation elements such as microwave antennae 48, 50 or infrared elements disposed above and below the adjacent runs 46, 47 of the belts 32, 38. The radiation transparent belts thus present substantially no impedence to the propagation of the radiant energy across the path of travel of the belts within the oven.

In this embodiment of the invention, each of the belt arrangements 32, 38 include a plurality of shielding container segments mounted to the periphery of the belts. The lower belt 32 carries the lower, tray-receptive segment 52 of the shielding container and the upper belt 38 carries the lid segments 54 of the shielding container. The spacing of the tray segments 52 on the lower belt arrangement 32 is regular and is identical to the spacing of the lids 54 on the upper belt so that as the belts advance in unison through the oven, the lids 54 may sequentially combine with the tray-segments 52 at the inlet end 28 of the oven and separate at the outlet end 30. Thus, the shielding containers defined by the combined tray- and lid-segments 52, 54 are substantially closed as they are advanced through the oven.

When the oven is of the microwave type, means should be provided for establishing a firm electrical connection between the upper and lower shielding container segments 52, 54 to preclude arcing. The lower container segment 52 is dimensioned to receive, at the inlet side of the oven, the food bearing tray 10 such as that shown in FIG. 3 having a precooked frozen or refrigerated meal.

The tray- and lid-shielding segments 52, 54 each are formed from a radiation opaque material such as highly polished stainless steel or other appropriate metallic composition. The lower shielding segments 52 each include a bottom wall 56 an upstanding sidewall 58, which are dimensioned to receive the food tray 10. The shielding lids 54 similarly are fabricated from an appropriate radiation opaque material and have at least a top wall 60 which, when combined with the lower shielding segment 52 lies substantially parallel to the bottom wall 56 of the tray-segment. The top wall 60 of the lid 54 is designed to mate firmly with the lower shielding segment 54 and may include a sidewall 62 for this purpose. It may be noted, however, that a number of structural configurations may be employed for the shielding segments 52 and 54 by which they may mate and thereafter separate at the inlet and outlet ends of the oven. In order to effectively synchronize the movement of the conveyor belt arrangements and the container segments 52, 54 therewith, the mating configuration of the segments 52, 54 to interlock as they mate. This arrangement may include formation of lugs on the lower of the segments 52 which engage the upper segment in gear-like fashion at the inlet end of the oven. The lugs 53 are effective to aid alignment of the segments 52, 54 and also to drive the upper conveyor belt arrangement 38. It may be noted further that in this embodiment of the invention, each of the segments 52, 54 is mounted by means of a transverse pivotal hinge arrangement 61, to enable each of the segments to pass freely about the associated drums 34, 36, 40, 42 of the conveyor belt arrangements.

Figure 4:
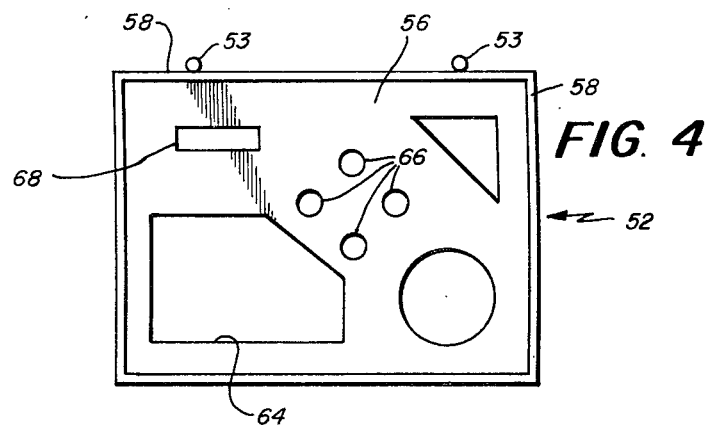
FIG. 4 is an illustration in plan of the bottom pan of the shielding box employed in one embodiment of the invention.
Figure 5:
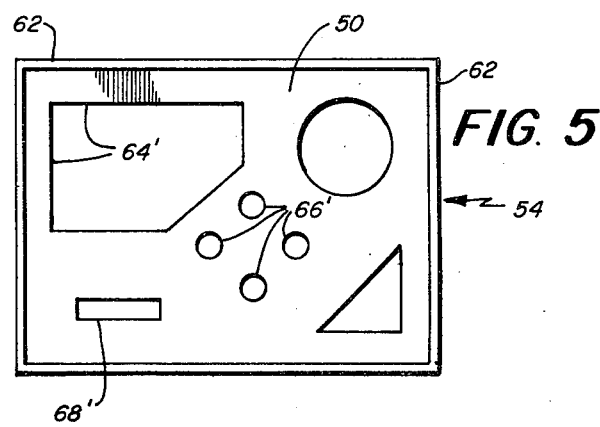
FIG. 5 is an illustration of the underside of the cover for the shielding box employed in one embodiment of the invention.

The above described parts are arranged so that a food tray 10 is disposed within the combined parts 52, 54 of the shielding container throughout the length of travel through the oven. In order to control the degree of exposure of the foods to the radiant energy, each of the walls 56, 60 of the combined shielding container include a group of radiation transparent apertures. As shown in FIGS. 4 and 5, the apertures in each group are arranged to be in alignment with corresponding compartments of the food tray 10 when the tray 10 is properly disposed within the container. The apertures in the top and bottom walls 56, 60 of the shielding container preferably are of substantially identical configuration and are in regisitry with each other when the container parts are mated. The food tray 10 and top and bottom walls 56, 60 are maintained in this relative alignment throughout the travel through the oven. In order to control the amount of radiation to which each of the foods in the various tray compartments is exposed, the apertures are pre-arranged in a configuration which will permit a predetermined degree of radiation to reach the various foods. For example, an entree such as meat in the tray compartment 16 will be in alignment with the relatively large apertures 64, 64' in the top and bottom walls 56, 60 to insure that the entree will be heat conditioned to the desired extent and will be delivered from the oven ready to eat and at the desired serving temperature. Similarly, a roll contained in compartment 24 of the tray 10 will be exposed to less radiation because of the reduced area of the radiation transparent openings 66, 66' in alignment with that compartment. The compartment 22 which is intended to contain a cold dessert is aligned with relatively narrow aligned openings 68, 68' in the tray and lid shielding members 52, 54 so that it will be exposed only to enough radiant energy to thaw it just slightly from the frozen state. With the foregoing arrangement, each of the foods is simultaneously exposed only to the degree of radiant energy required in order to properly heat condition it. When the heat conditioned food tray 10 has been advanced to the outlet end 30 of the oven, the container segments 52, 54 separate and the food tray 10 with the complete meal may be unloaded from the lower shielding segment 52.

The foregoing arrangement is adaptable to both microwave as well as infrared ovens. With microwave ovens, the food tray 10 should be made from a suitable material, as mentioned above, which is transparent to microwave energy. The segments 52, 54 of the shielding container should be made from or at least coated with an appropriate metallic material which is a conductor of microwave energy. When the oven is of the infrared type, the segments 52, 54 of the shielding container should be suitably polished or otherwise rendered reflective of the infrared radiation. It may be noted that when the invention is employed in an infrared oven, the ideal type of food tray 10 whould be one which is made from a clear plastic material which is substantially transparent to infrared radiation, thereby to enable the food in each of the compartments to be exposed to equal amounts of infrared radiation both from above and below. However, reasonably satisfactory results are obtainable in an infrared oven even when the food tray 10 is not entirely transparent to the infrared radiation. Such radiation emanating from below the food trays would tend to heat the bottom of the tray and some of this heat would be conducted to the food within the tray. The control over such partially conductive heating through the bottom of the tray 10 may be enhanced by causing cooling air to flow about the underside of the tray 10 and lower shielding element 52.

In another embodiment of the invention, the above described shielding arrangement of separable container segments 52, 54 may be eliminated by incorporating the radiation opaque shielding directly in the conveyor belts themselves. In such an arrangement, the upper and lower conveyor belts may be of sheet-like configuration and made from a radiation transparent material. Each of the belts may be impregnated or coated with a radiation opaque or reflective material except for those regions which would be intended to define the repetitive groups of radiation transparent apertures. Alternatively, the belts could be coated or laminated to include a film of such radiation opaque material having the repetitive groups of apertures formed therein. With this arrangement, means may be provided for synchronizing and registering the operation of the conveyor belts so that their linear speed of travel would be the same and with their repetitive groups of radiation transparent apertures in alignment with each other as the adjacent runs of the belts advance through the oven. In either of these alternative, means also are provided for locating properly the food tray on the lower belt so that their respective compartments will be aligned properly with the aligned radiation transparent apertures in each group. In a further alternative the belts may be made from a thin, flexible continuous web of stainless steel having the apertures formed therein.

While the best results are generally obtained when employing radiation shields with aligned apertures on opposite sides of the food tray, acceptable results may sometimes be obtained even if the apertures above and below the tray are only partly registered although as the extent of registration decreases, the evenness of heating and control over the heating generally is correspondingly reduced. It is intended that where apertured shields are employed on opposite sides of the food tray, the apertures at least in part overlap. In addition, while it is generally desirable to have the generally aligned apertures of the same size and configuration, there may be some instances which it is desirable to have an aperture of somewhat different size or shape from the corresponding aperture on the other side of the tray. For example, this may be desirable in an infrared oven in which the food is contained in a compartment having upwardly sloping sidewalls, and which case, the upper surface of the food might be larger in area than the surface of the food at the bottom of the tray compartment. In this instance it might be desirable to provide an enlarged radiation transparent aperture on top of the tray and a small aperture at the bottom.

It has been found that with some food combinations, acceptable results may be obtained by providing a shield at one side only of the food tray. When that technique is employed the upper belt may be omitted in that there is no need to shield the upper surface of the food tray. Instead, only the lower belt is provided with suitable shielding formed thereon and on which the food bearing tray may be placed. In general, this technique has given acceptable results primarily with meals having relatively few food components, (two or three) in which each of the food components requires a substantial amount of heat conditioning and is intended to be served quite hot (e.g. meat, potatoes).

Figure 6:
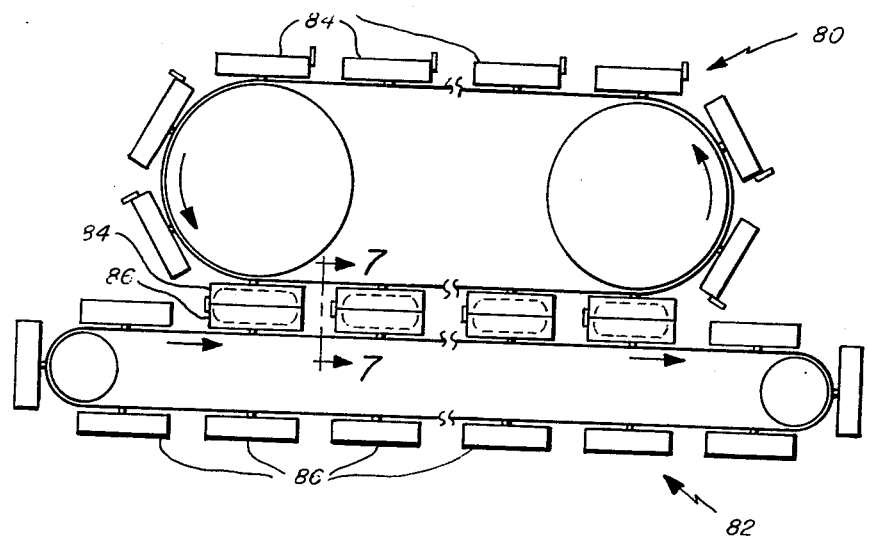
FIG. 6 is a diagrammatic illustration of a modified form of shielding enclosure usable with individual component foods.
Figure 7:
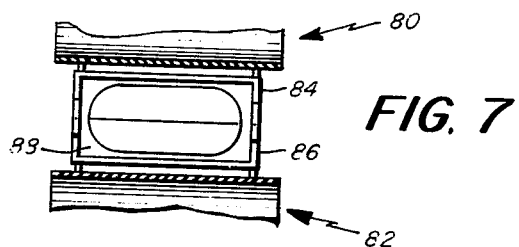
FIG. 7 is an illustration of the arrangement shown in FIG. 6 as seen along the line 7—7.

The principles of the invention also may be employed in connection with food items composed of a single food component. For example, as shown in FIGS. 6 and 7 it is desired to heat condition hamburg buns, the conveyor and shielding system may include a both upper and lower conveyors 80, 82 but with shielding segments 84, 86 on each of the conveyors 80, 82 which are substantially free of apertures. The ends of each of the shielding segments 84, 86 are open (FIG. 7) so that when the segments 84, 86 combined one or both of the ends of the resulting enclosure will be open, as at 88, to permit stray radiation to enter into the enclosure and thus heat the bun or bread only to the desired extent.

It should be understood that the foregoing description of the invention is intended merely to be illustrative thereof and that other modifications and embodiments may be apparent to those skilled in the art without departing from its spirit.

Having thus described the invention what I desire to claim and secure by Letters Patent is:

1. An apparatus for simultaneously and selectively heating food by radiant energy comprising:
   an oven having means for generating a radiant energy field therein, said oven having an inlet and an outlet end;
   lower conveyor means mounted for movement through said oven from said inlet to said outlet and along a path which extends through said energy field;
   upper conveyor means mounted in relation to said oven for movement therethrough from said inlet to said outlet and along a path substantially parallel to said lower conveyor means but spaced therefrom;
   means carried by each of said conveyor means for defining a sequence of radiation opaque regions disposed along each of said conveyor means, said radiation opaque regions being equally spaced on each of said upper and lower conveyor means;
   means forming at least one radiation transparent opening in each of said radiation opaque regions, the arrangement and configuration of the openings in said opaque regions on said upper conveyor means and said lower conveyor means being such that an opaque region on said upper conveyor means and an opaque region on said lower conveyor means may be aligned at least generally with their apertures being at least in overlapping relation; and
   means for advancing both said conveyor means in the same direction and in synchronized unison in which said opaque regions carried by the adjacent portions of the said conveyor means may pass through said energy field in said at least general alignment with each other and with their radiant transparent openings in said at least overlapping relation with each other.

2. An apparatus as defined in claim 1 wherein said radiation opaque regions on the lower of said conveyor means further comprises:
   means for receiving both a compartmented radiation transparent tray and for retaining said tray so that the compartments thereof are in substantial alignment with one of said groups of radiation transparent openings whereby when said tray is conveyed through said oven, its compartment will be maintained in alignment with the radiation transparent apertures both above and below said tray.

3. An apparatus as defined in claim 2 further comprising:
   each of said upper and lower conveyor means including endless belt means and being mounted so that said adjacent portions of said conveyor means comprise the lower run of said upper belt means and the upper run of said lower belt means; and
   said radiation opaque regions being carried by each of said upper and lower belt means in a manner such that they may combine to define a shielding container at the inlet end of said oven and where said upper and said lower belt means advance into their adjacent configuration and to thereafter separate at the outlet end of said oven to expose the interior of said container.

4. An apparatus as defined in claim 3 wherein said opaque regions carried by said conveyor belts further comprise:
   a lower container segment mounted to said lower belt means;
   an upper container segment mounted to said upper belt means; and
   means constructing said upper and lower container segments so that when they combine at the inlet end of said oven to define said shielding container, said segments interlock thereby enabling both of said conveyor belts to be advanced in response to driving of only one of said belts.

5. An apparatus as defined in claim 4 wherein each of said upper and lower belt means are supported by a pair of drums and further comprise:
   each of said shielding container segments being pivotally mounted to its associated belt means thereby to enable each of said belt means to pass freely about its associated supporting drums.

6. An apparatus as defined in claim 3 wherein said oven comprises an infrared oven further comprising:
   means mounting infrared energy radiating means within said oven both above and below said adjacent runs of said belt means; and
   said radiation opaque regions being defined at least in part by reflective surface means.

7. An apparatus as defined in claim 1 wherein each of said conveyor means comprises a pair of horizontally spaced paralleling belts:
   means for supporting said radiation opaque regions on said belts so that said opaque regions extend horizontally between said spaced belts whereby said belts present substantially no impedance to the propagation of said radiant energy.

8. A method for simultaneously heat conditioning foods having different heating requirements comprising:
   providing a field of radiant energy to heat said foods;
   conveying a tray carrying each of said foods in different compartments thereof through said energy field, said tray being substantially transparent to said radiant energy;
   embracing said tray as it enters said energy field with radiation opaque shielding means both above and below said conveyed food tray, each of said shielding means including a group of radiation transparent apertures in alignment with selected of said tray compartments;
   conveying said tray and shielding means in unison through said energy field; and
   separating said tray from said shielding means as said tray exits from said energy field.

9. A method for simultaneously heat conditioning foods having different heating requirements comprising:

providing a field of radiant energy to heat said foods;
conveying a tray carrying each of said foods in different compartments thereof through said energy field, said tray being substantially transparent to said radiant energy;
embracing said tray as it enters said energy field with shielding means, at least in part opaque to said radiation on at least one side of said tray to at least partly shield the food items in said tray;
conveying said tray and shielding means in unison through said energy field; and
separating said tray from said shielding means as said tray exits from said energy field.

10. A method for simultaneously heat conditioning a plurality of foods having different heating requirements comprising:

providing a field of radiant energy to heat said foods;
conveying a tray carrying each of said foods in different compartments thereof through said energy field;
said tray being substantially transparent to said radiant energy;
embracing said tray as it enters said energy field with radiation opaque shielding means both above and below said conveyed food tray, each of said shielding means including at least one radiation transparent aperture therein in at least partial registry with each other and with a selected of said tray compartments;
conveying said tray and shielding means in unison through said energy field; and
separating said tray from said shielding means as said tray exits from said energy field.

11. A method for heat conditioning a food item comprising:

providing a field of radiant energy to heat said food item;
conveying said food item through said energy field;
embracing said food item as it enters said energy field with a shield and conveying said shield through said energy field in unison with said food item, said shield being at least partly transparent to said radiation; and
separating said food item from said shield as said food item exits from said energy field.

12. An apparatus for simultaneously and selectively heating food by radiant energy comprising:

an oven having means for generating a radiant energy field therein said oven having an inlet end and outlet end;
conveyor means mounted for movement through said oven from said inlet to said outlet means and along a path which extends through said energy field;
means carried by said conveyor means for defining radiation opaque regions disposed along said conveyor means;
means forming at least one radiation transparent opening in said radiation opaque regions; and
means carried by said conveyor means for receiving in alignment with an opaque region, a radiation transparent tray having a plurality of food receiving compartments with said at least one radiation transparent opening in alignment with at least one of said tray compartments and for transporting said tray through said oven in unison with said radiation opaque region.

13. An apparatus for simultaneously and selectively heating food by radiant energy comprising:

an oven having means for generating a radiant energy field therein said oven having an inlet end and outlet end;
lower conveyor means mounted for movement through said oven from said inlet to said outlet means and along a path which extends through said energy field;
upper conveyor means mounted in relation to said oven for movement therethrough from said inlet to said outlet and along a path substantially parallel to said lower conveyor means but spaced therefrom;
means carried by each of said conveyor means for defining a sequence of radiation opaque regions disposed along each of said conveyor means, said opaque regions being equally spaced on each of said upper and lower conveyor means;
means forming a group of radiation transparent openings in each of said radiation opaque regions, the arrangement and configuration of the openings in said opaque regions on said upper conveyor means being substantially identical to those on said lower conveyor means; and
means for advancing both said conveyor means in the same direction and in synchronized unison in which said opaque regions carried by the adjacent portions of said conveyor means may pass through said energy field in alignment with each other and with their groups of radiation transparent apertures also in alignment with each other.

* * * * *